(12) United States Patent
Tsai et al.

(10) Patent No.: US 7,161,534 B2
(45) Date of Patent: Jan. 9, 2007

(54) HYBRID BEAMFORMING APPARATUS AND METHOD FOR THE SAME

(75) Inventors: Jiann-An Tsai, Ping Tung Hsien (TW); Wei Ping Chuang, Kao Hsiung (TW); Chun-Chun Kuo, Hsin Chu (TW); Yung-Yih Jian, Tao Yuan (TW)

(73) Assignee: Industrial Technology Research Institute, Hsinchu Hsien (TW)

( * ) Notice: Subject to any disclaimer, the term of this patent is extended or adjusted under 35 U.S.C. 154(b) by 155 days.

(21) Appl. No.: 10/939,480

(22) Filed: Sep. 14, 2004

(65) Prior Publication Data

US 2006/0012520 A1   Jan. 19, 2006

(30) Foreign Application Priority Data

Jul. 16, 2004  (TW) .............................. 93121435 A (51) Int. Cl.
*H01Q 3/00* (2006.01)
*G01S 3/16* (2006.01)

(52) U.S. Cl. ...................... 342/377; 342/378; 342/383; 375/144; 375/148

(58) Field of Classification Search ................ 342/377, 342/378, 383; 375/144, 148
See application file for complete search history.

(56) References Cited

U.S. PATENT DOCUMENTS 6,351,499 B1   2/2002  Paulraj et al.
6,369,758 B1   4/2002  Zhang
6,504,506 B1   1/2003  Thomas et al.
2002/0172308 A1  11/2002  Harel et al.
2003/0072258 A1   4/2003  Tarokh et al.
2004/0001554 A1*  1/2004  Sun et al. .................... 375/260

FOREIGN PATENT DOCUMENTS

JP       2003309537 A   * 10/2003

OTHER PUBLICATIONS

English translation of JP 2003309537 A.*
C.K. Kim et al., Adaptive beamforming for an OFDM system, IEEE 49th Vehicular Technology Conference, vol. 1, p. 484-488, Jul. 1999.*

* cited by examiner

*Primary Examiner*—Thomas H. Tarcza
*Assistant Examiner*—F H Mull
(74) *Attorney, Agent, or Firm*—Rabin & Berdo, P.C.

(57) ABSTRACT

A hybrid beamforming apparatus and method are proposed for a communication system. The hybrid beamforming apparatus includes a plurality of antennas, a plurality of FFT, a plurality of hybrid weight-coefficient generators and a plurality of adders. In each of the hybrid weight-coefficient generators, the weight coefficient for each subcarrier is calculated by a time-domain correlation matrix and a cross-correlation vector, which is calculated by a frequency domain signal and a training signal. The hybrid beamforming apparatus and method according to the present invention can enhance immunity for multipath effect with lower system complexity.

12 Claims, 7 Drawing Sheets

HYBRID BEAMFORMING APPARATUS AND METHOD FOR THE SAME

BACKGROUND OF THE INVENTION

1. Field of the Invention

The present invention relates to a hybrid beamforming apparatus and a method for the same, more particularly to a hybrid beamforming apparatus for enhancing immunity for multipath effect with lower system complexity and a method for the same.

2. Description of Prior Art

In wireless communication system, the multipath effect and fading effect are two major reasons accounting for interference. Especially in metropolitan area, the received signal is subjected to multiple reflections by buildings between mobile stations and base stations. The channel characteristics have dynamical change with the movement of mobile station. To overcome multipath effect, an equalizer can be used to provide compensation. However, the complexity of the equalizer is increased with channel delay. Multicarrier techniques such as OFDM are adopted to reduce equalizer complexity and applied to IEEE802.11a, IEEE802.11g, and IEEE802.16a based systems.

Moreover, multiple-antenna system, such as smart antenna system, is developed to overcome fading effect and co-channel interference. The received signals from antennas of the multiple-antenna system are added to form a beam and the interference can be removed. The performance of the multiple-antenna system could be enhanced by diversity combining techniques such as Maximum Ratio Combining, Equal Gain Combining, Selective Combining, or adaptive algorithm.

In multiple-antenna system, a plurality of antennas is used to form a spatial filter. The signals propagated from a specific direction will form a beam with maximal gain and signals from other directions are rejected to eliminate interference. Therefore, the multiple-antenna system is also referred as smart antenna system or adaptive antenna array system.

Figure 1:
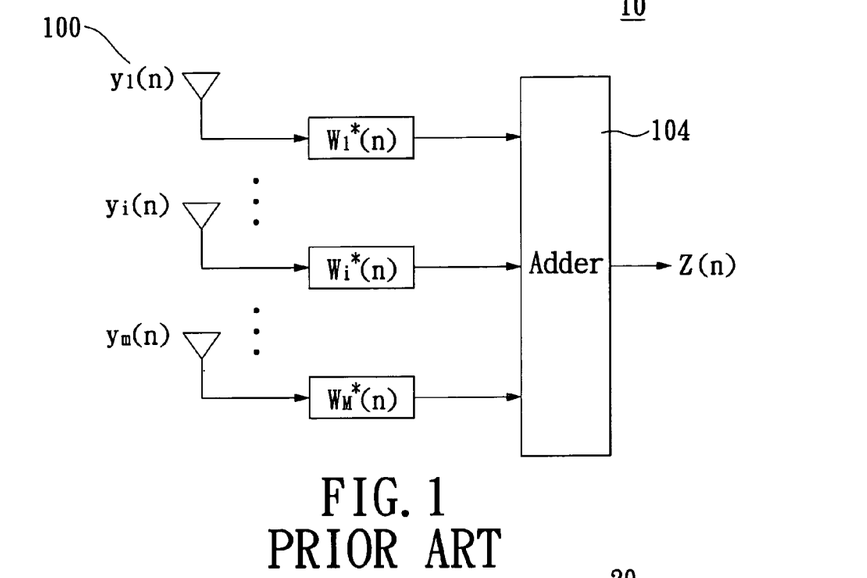
FIG. 1 shows a block diagram of a prior art beamforming apparatus 10 for wireless communication system.

FIG. 1 shows a block diagram of a prior art beamforming apparatus 10 for wireless communication system. The signals $y_i(n)$ received by the antennas 100 are multiplied by corresponding weight coefficient $w_i^*$, and then processed by an added 104. The sum $z(n)$ thereof is output with following expression:

$$z(n) = \sum_{i=1}^{M} w_i^* y_i(n)$$

wherein n indicates different time and weight coefficients $w_i^*$ are selected to achieve maximal gain and deduced by adaptive algorithm. The adaptive algorithm can be, but not limited to ML (Maximum Likelihood), MSNR (Maximum Signal to Noise Ratio), MSINR (Maximum Signal to Interference Noise Ratio), and MMSE (Minimum Mean Square Error) etc.

The deduction of weight coefficients is exemplified by MMSE criterion below. At first a cost function J is defined as following:

$$J = E[|d(n) - z(n)|^2]$$

wherein $d(n)$ is training signal from the sender, and the weight coefficients deduced by MMSE algorithm are represented by Wiener-Hopf equation.

$$w_{opt} = R_{yy}^{-1} r_{yd}$$

where $$w_{opt} = [w_1, w_2, \cdots, w_M]^T, r_{yd} = [r_{y_1 d}, r_{y_2 d}, \cdots, r_{y_M d}]^T,$$

$$R_{yy} = \begin{bmatrix} r_{y_1 y_1} & r_{y_1 y_2} & \cdots & r_{y_1 y_M} \\ r_{y_2 y_1} & \cdots & & \\ \vdots & & \cdots & \vdots \\ r_{y_M y_1} & \cdots & \cdots & r_{y_M y_M} \end{bmatrix}.$$

and $r_{y_i d} = E[y_i(n) d^*(n)]$ is the cross-correlation coefficient of $y_i(n)$ and $d(n)$, $r_{y_i y_j} = E[y_i(n) y_j^*(n)]$ is cross-correlation coefficient of $y_i(n)$ and $y_j(n)$ when $i \neq j$ or auto-correlation coefficient of $y_i(n)$ and $y_j(n)$ when $i = j$.

The calculation of $R_{yy}$ and $r_{yd}$ can be performed in time domain and frequency domain, which will be stated in more detail below.

Figure 2A:
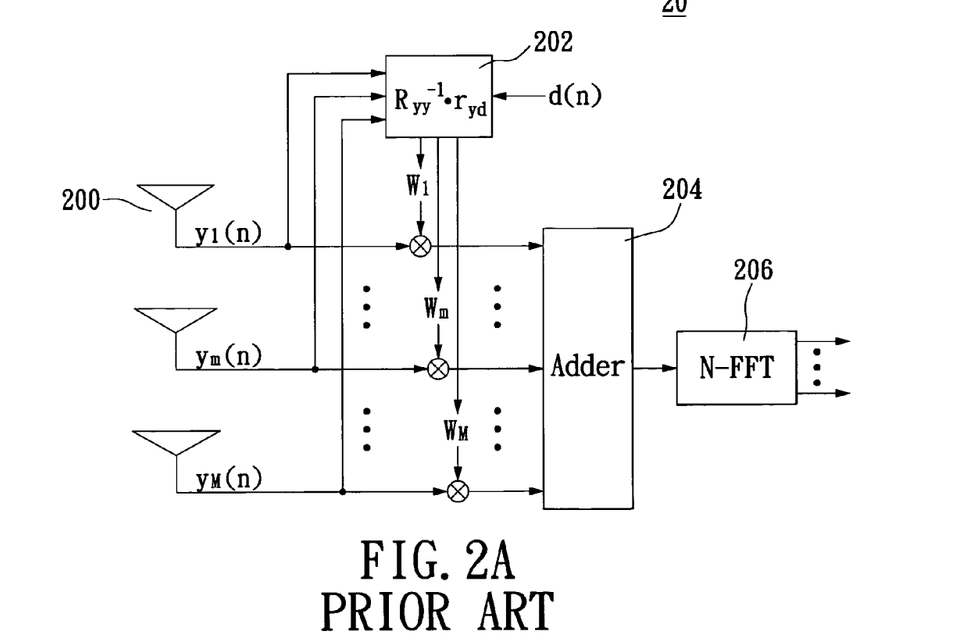
FIG. 2A shows a block diagram of a prior art time-domain beamforming apparatus.
Figure 2B:
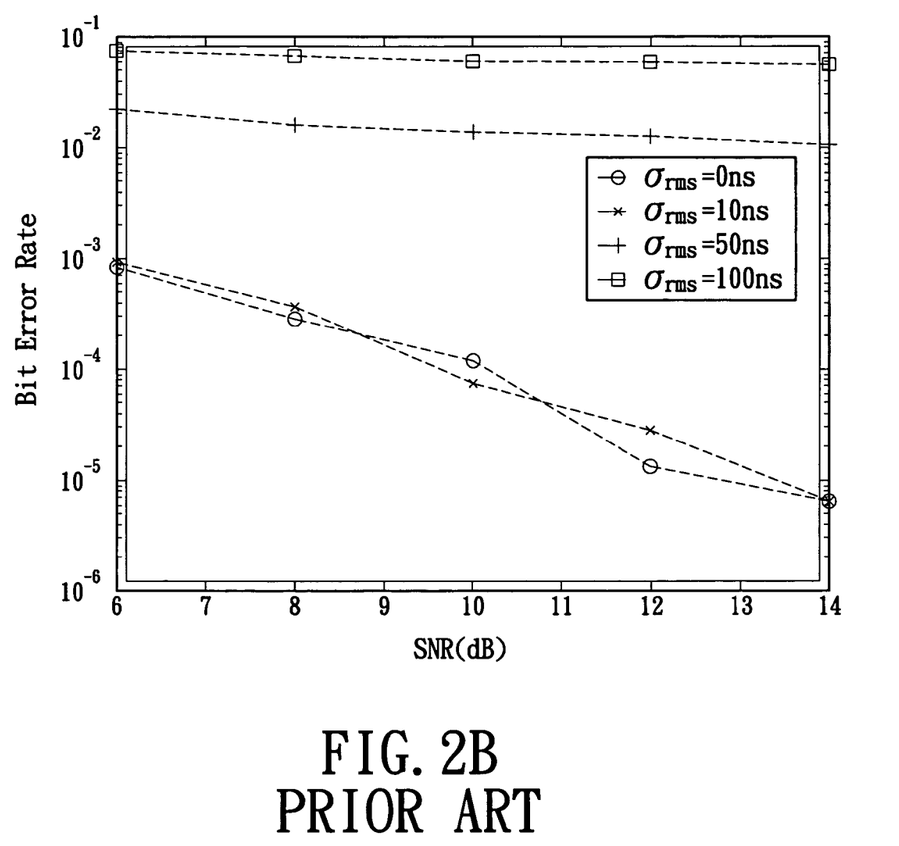
FIG. 2B shows the performance of the prior art time-domain beamforming apparatus.

FIG. 2A shows a block diagram of a prior art time-domain beamforming apparatus 20, which comprises a plurality of antennas 200, a weight-coefficient generator 202 for receiving the detected signals $y_i(n)$ of the antennas 200 and a training signal $d(n)$, an adder 204 and an FFT (Fast Fourier Transform) 206. As can be seen in this figure, the prior art time-domain beamforming apparatus 20 calculates only one inverse matrix $R_{yy}$ and no other FFT operation. The calculation of $R_{yy}$ and $r_{yd}$ are performed by time domain sampling to reduce complexity. More particularly, $y_i(n)$ are obtained by directly sampling the detected signal of antennas and $d(n)$ is time-domain training signal. The performance of above time-domain beamforming apparatus 20 is sensitive to channel characteristic. The BER (bit error rate) of the time-domain beamforming apparatus 20 is rapidly increased as the delay profile related to multipath effect is increased. FIG. 2B shows the performance of the prior art time-domain beamforming apparatus. As shown in this figure, the BER of the system is excessive when the delay time exceeds 50 ns.

Figure 3A:
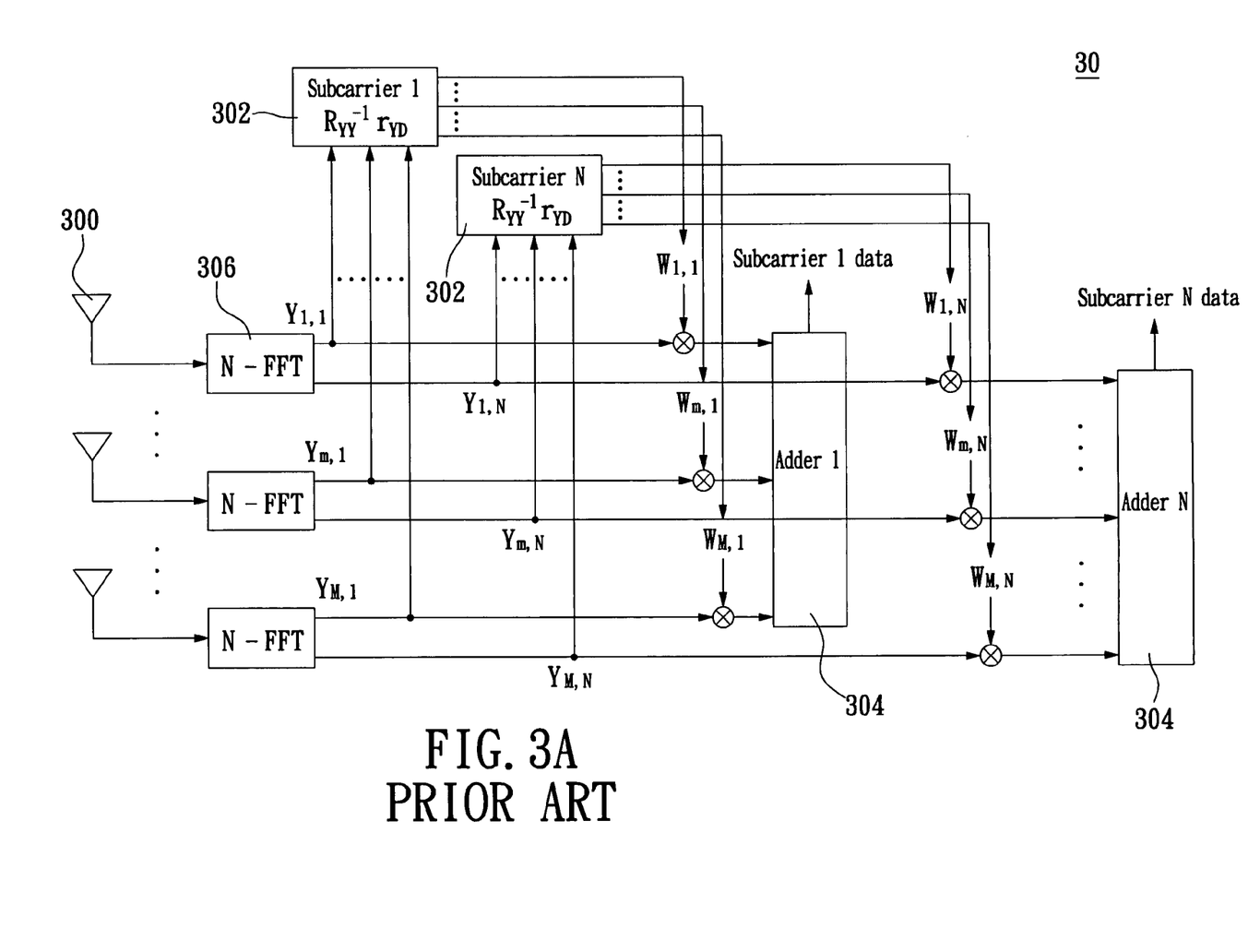
FIG. 3A shows a block diagram of a prior art frequency-domain beamforming apparatus.

FIG. 3A shows a block diagram of a prior art frequency-domain beamforming apparatus 30, which comprises a plurality of antennas 300, a plurality of FFTs 306 for converting time-domain received signals to frequency-domain counterparts, a plurality of weight-coefficient generators 302 for receiving the frequency-domain signals of the FFTs 306, a plurality of adders 304 for summing the product of weigh coefficient and frequency-domain signals to obtain frequency-domain data signal for each subcarrier. In the prior art frequency-domain beamforming apparatus 30, the calculation of $R_{YY}(k)$ and $r_{YD}(k)$ are performed in frequency domain. The signals received by antennas are converted by N-point FFT and the output $Y(k)$ is generated for each subcarrier, wherein capital symbol in sub Y and D indicate frequency-domain signals and the k is number of subcarrier. Therefore, $R_{YY}(k)$ and $r_{YD}(k)$ could be calculated for each subcarrier.

More particularly, $$Z(k) = \sum_{i=1}^{M} w_i^*(k) Y_i(k)$$

is the output of the frequency-domain beamforming apparatus 30, $w_{opt}(k) = R_{YY}^{-1}(k) r_{YD}(k)$ is the optimal weight coefficients deduced by Wiener-Hopf equation, and $$w_{opt}(k) = [w_1(k), w_2(k), \cdots, w_M(k)]^T,$$

$$r_{YD}(k) = [r_{Y_1(k)D(k)}, r_{Y_2(k)D(k)}, \cdots, r_{Y_M(k)D(k)}]^T,$$

$$R_{YY}(k) = \begin{bmatrix} r_{Y_1(k)Y_1(k)} & r_{Y_1(k)Y_2(k)} & \cdots & r_{Y_1(k)Y_M(k)} \\ r_{Y_2(k)Y_1(k)} & \cdots & & \\ \vdots & & \cdots & \vdots \\ r_{Y_M(k)Y_1(k)} & \cdots & \cdots & r_{Y_M(k)Y_M(k)} \end{bmatrix}.$$

As can be seen in FIG. 3A, the frequency-domain beamforming apparatus 30 has significant increase in system complexity as being compared with time-domain beamforming apparatus. The inverse matrix calculation is proportional to subcarrier number and the FFT calculation is proportional to antenna number. More particularly, the system complexity of frequency-domain beamforming apparatus is (subcarrier number×antenna number) times complicated than the time-domain beamforming apparatus.

Figure 3B:
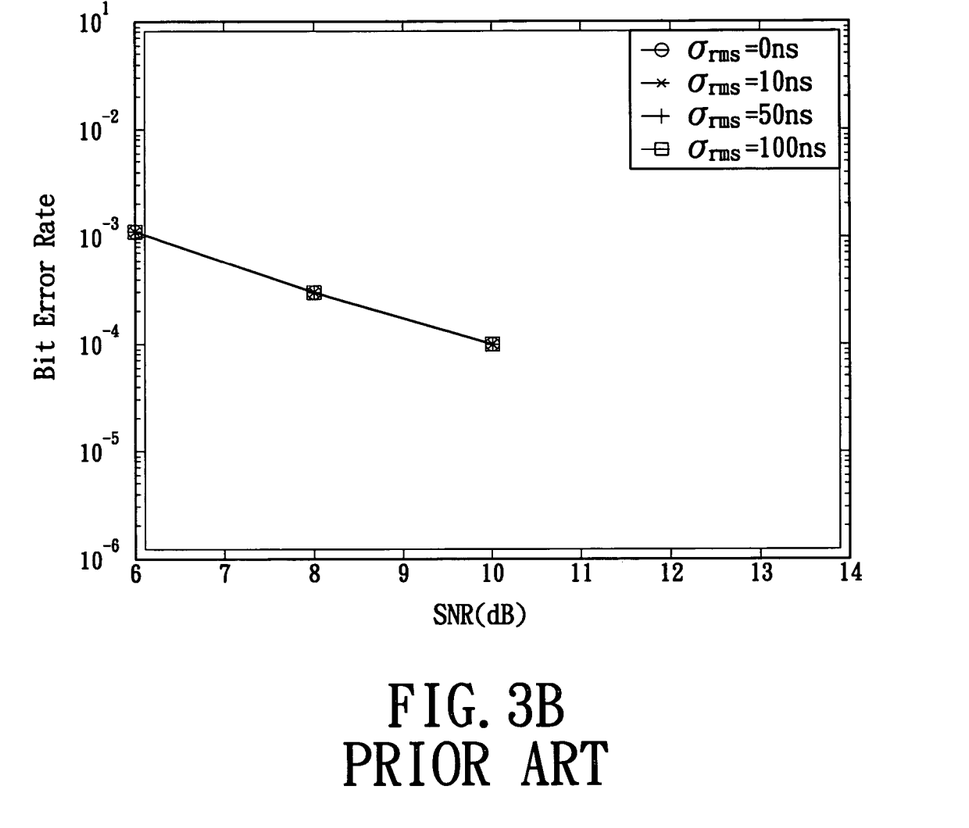
FIG. 3B shows the performance of the prior art frequency-domain beamforming apparatus.

FIG. 3B shows the performance of the prior art frequency-domain beamforming apparatus. As shown in this figure, the performance of the frequency-domain beamforming apparatus is not deteriorated by channel delay. The BER keeps nearly constant as the channel delay is increased. The frequency-domain beamforming apparatus achieves immunity to multipath effect at the expense of increased system complexity.

In an OFDM (Orthogonal Frequency Division Multiplexing) system, each subcarrier transmits through one-path channel and the multipath effect can be reduced. It is benefic to exploit the property of OFDM system and use it with frequency-domain beamforming apparatus to obtain immunity to multipath effect with less system complexity.

SUMMARY OF THE INVENTION

It is an object of the present invention to provide a hybrid beamforming apparatus for enhancing immunity for multipath effect with lower system complexity and a method for the same.

To achieve the above object, the present invention provides a hybrid beamforming apparatus, which includes a plurality of antennas, a plurality of FFT, a plurality of hybrid weight-coefficient generators and a plurality of adders. In each of the hybrid weight-coefficient generators, the weight coefficient for each subcarrier has the form $$w_{opt}(k) = \frac{1}{N} R_{yy}^{-1} r_{YD}(k)$$

and is calculated by a time-domain correlation matrix and a cross-correlation vector, which is calculated by a frequency domain signal and a training signal.

To achieve the above object, the present invention provides a hybrid beamforming method for a communication system, which comprises the steps of: (a) receiving a plurality of time-domain signals with a plurality of antennas from a wireless signal; (b) processing the time-domain signals into a plurality of frequency-domain signals; (c) obtaining a plurality of hybrid weight coefficients from the time-domain signals, the frequency-domain signals and a training signal, wherein the plurality of hybrid weight coefficients are corresponding to a plurality of subcarriers; and (d) obtaining an output signal for each subcarrier by operation on the hybrid weight coefficients and the frequency-domain signals. In the step (c), the weight coefficient for each subcarrier has the form $$w_{opt}(k) = \frac{1}{N} R_{yy}^{-1} r_{YD}(k)$$

and is calculated by a time-domain correlation matrix and a cross-correlation vector, which is calculated by a frequency domain signal and a training signal.

The above summaries are intended to illustrate exemplary embodiments of the invention, which will be best understood in conjunction with the detailed description to follow, and are not intended to limit the scope of the appended claims.

BRIEF DESCRIPTION OF THE DRAWINGS

The features of the invention believed to be novel are set forth with particularity in the appended claims. The invention itself however may be best understood by reference to the following detailed description of the invention, which describes certain exemplary embodiments of the invention, taken in conjunction with the accompanying drawings in which:

DETAILED DESCRIPTION OF THE INVENTION

Figure 4A:
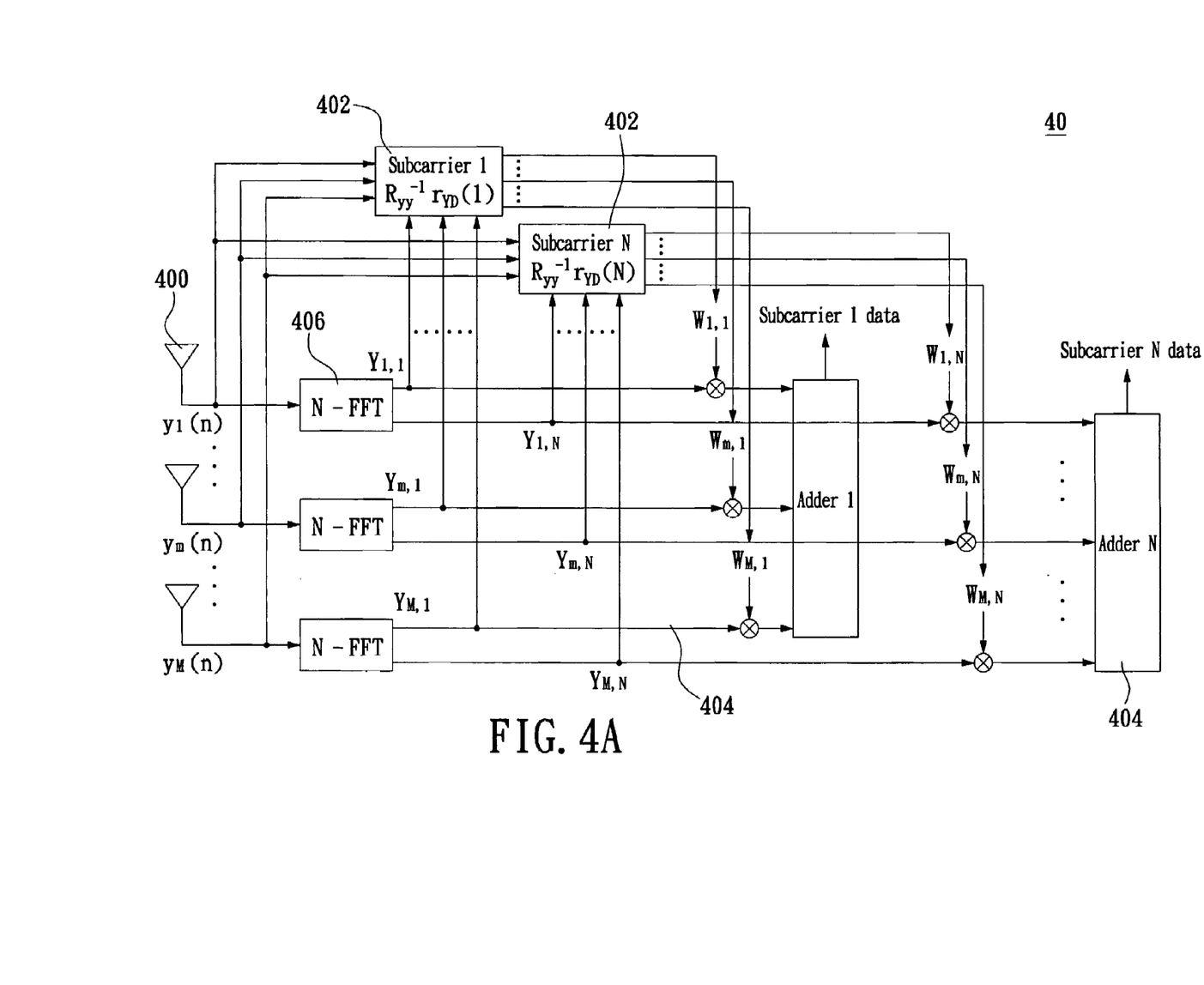
FIG. 4A shows a block diagram of the hybrid beamforming apparatus 40 according to the present invention.

FIG. 4A shows a block diagram of the hybrid beamforming apparatus 40 according to the present invention, which can be advantageously used in WLAN, WMAN and cellular system. The hybrid beamforming apparatus 40 comprises a plurality of antennas 400, a plurality of FFTs 406 for converting time-domain received signals to frequency-domain counterparts, a plurality of hybrid weight-coefficient generators 402 for receiving the frequency-domain signals of the FFTs 406 and time-domain signals of the antennas 400, and a plurality of adders 404 for summing the product of weigh coefficient and frequency-domain signals to obtain frequency-domain data signal for each subcarrier. The FFTs 406 can be replaced by DFT (Discrete Fourier Transform) to achieve similar function.

In above-mentioned hybrid beamforming apparatus 40, the weight coefficients are generated in hybrid manner. A time-domain correlation matrix $R_{yy}$ is generated by time-domain signals. A cross-correlation vector $r_{YD}(k)$ for each subcarrier is generated by frequency-domain signal and a training signal. Afterward, the weight coefficients are generated by operation over the time-domain correlation matrix $R_{yy}$ and the cross-correlation vector $r_{YD}(k)$. The hybrid beamforming apparatus 40 according to the present invention has less complexity in comparison with frequency-domain beamforming apparatus and has better immunity to multipath effect in comparison with time-domain beamforming apparatus.

Moreover particularly, the correlation matrix $R_{YY}(k)$ is not calculated for each subcarrier to save the effort of inverse matrix calculation. In the present invention, all hybrid weight-coefficient generators 402 share the same time-domain correlation matrix $R_{yy}$. Therefore, the hybrid beamforming apparatus 40 according to the present invention needs only one time calculation for the time-domain correlation matrix $R_{yy}$, and the time-domain correlation matrix $R_{yy}$ is used for all subcarriers. The time-domain correlation matrix $R_{yy}$ and the averaged frequency-domain correlation matrix $R_{YY}(k)$ have following relationship:

$$r_{Y_i(k)Y_j(k)} = E[Y_i(k)Y_j^*(k)] = N \cdot E[y_i(n)y_j^*(n)] = N \cdot r_{y_iy_j},$$

$$R_{YY}(k) = N \cdot R_{yy}$$

As can be seen from above expressions, the averaged frequency-domain correlation matrix $R_{YY}(k)$ is equivalent to the time-domain correlation matrix $R_{yy}$ multiplied by the subcarrier number N. Therefore, in the calculation of weigh coefficients, the correlation matrix $R_{yy}$ is calculated in time domain, and the cross-correlation vector $r_{YD}(k)$ is calculated for each subcarrier. Following similar deduction, we can conclude $r_{YD}(k) = N \cdot r_{yd}$. The weight coefficient for each subcarrier is $$w_{opt}(k) = \frac{1}{N} R_{yy}^{-1} r_{YD}(k).$$

The hybrid beamforming apparatus 40 shown in FIG. 4A has far reduced complexity in comparison with frequency-domain counterpart and has slightly increased complexity in comparison with time-domain counterpart. More particularly, the hybrid beamforming apparatus 40 needs FFTs with the same amount as antenna number and one inverse matrix calculation unit.

Figure 4B:
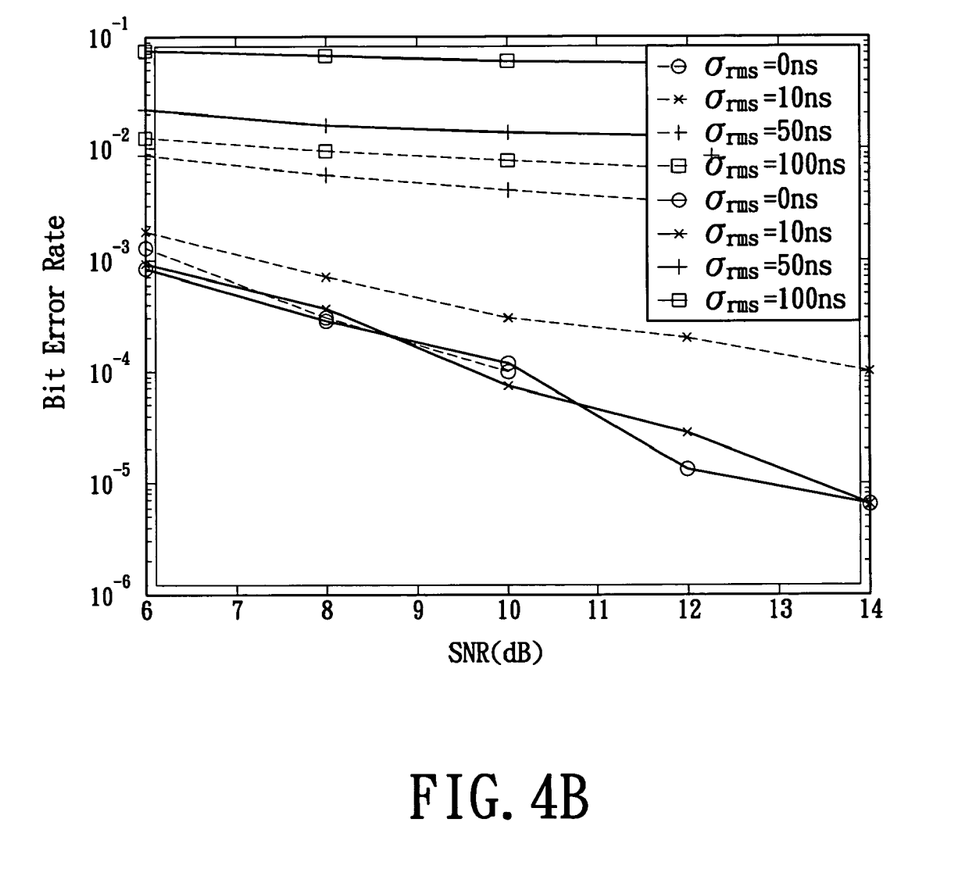
FIG. 4B shows the performance of the hybrid beamforming apparatus 40 according to the present invention.

FIG. 4B shows the performance of the hybrid beamforming apparatus 40 according to the present invention in comparison with the time-domain counterpart. The performance of the hybrid beamforming apparatus 40 is indicated by dashed line and the performance of the time-domain counterpart is indicated by solid line. The performance of the time-domain beamforming apparatus is seriously deteriorated by ISI (intersymbol interference) when channel delay time exceeds 50 ns. On the contrary, the hybrid beamforming apparatus 40 according to the present invention has better immunity to multipath effect on virtue that the cross-correlation vector $r_{YD}(k)$ is individually calculated for each subcarrier.

Figure 5:
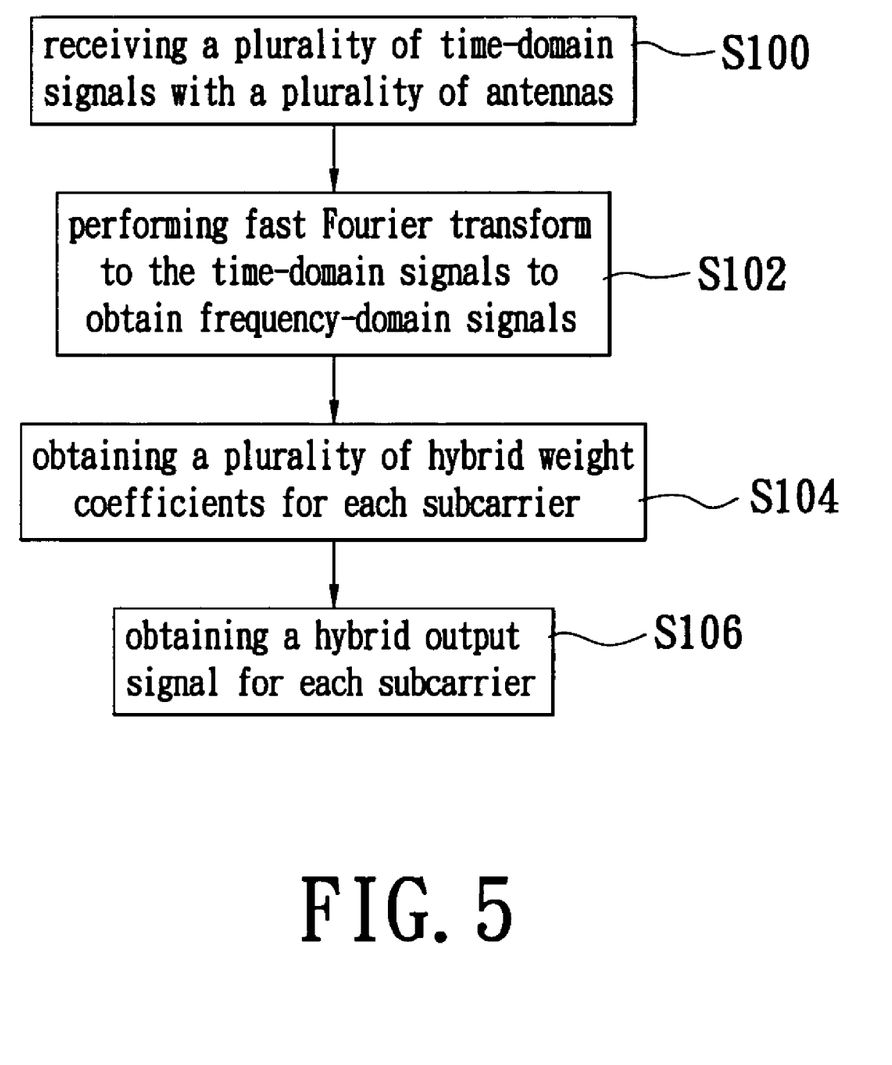
FIG. 5 is a flowchart for operation of the hybrid beamforming apparatus 40 according to the present invention.

FIG. 5 is a flowchart for operation of the hybrid beamforming apparatus 40 according to the present invention. The operation comprises following steps:

S100: receiving a plurality of time-domain signals with a plurality of antennas;

S102: performing fast Fourier transform to the time-domain signals to obtain frequency-domain signals;

S104: obtaining a plurality of weight coefficients $$w_{opt} = \frac{1}{N} R_{yy}^{-1} r_{YD}(k),$$

each for a subcarrier k, wherein the time-domain correlation matrix $R_{yy}$ is generated by time-domain signals, the cross-correlation vector $r_{YD}(k)$ for each subcarrier is generated by frequency-domain signal and a training signal;

S106: obtaining a hybrid output signal for each subcarrier by the plurality of weight coefficients and the plurality of frequency-domain signals.

To sum up, the hybrid beamforming apparatus and method according to the present invention uses a time-domain correlation matrix and a cross-correlation vector to obtain hybrid weight coefficient. The hybrid beamforming apparatus and method can enhance immunity for multipath effect with lower system complexity.

What is claimed is:

1. A hybrid beamforming apparatus for a communication system, comprising
   a plurality of antennas receiving a wireless signal to generate a plurality of time domain signals;
   a plurality of converters connected to the antennas and converting the plurality of time domain signals into a plurality of frequency domain signals;
   a plurality of hybrid weight-coefficient generators connected to the antennas and the converters, receiving the plurality of time domain signals, the plurality of frequency domain signals and a training signal, and generating a plurality of hybrid weight coefficients, the hybrid weight coefficients being calculated according to the formula $$w_{opt}(k) = \frac{1}{N} R_{yy}^{-1} r_{YD}(k),$$

where $R_{yy}$ is a time-domain correlation matrix and $r_{YD}(k)$ is a cross-correlation vector for a subcarrier k; and
   a plurality of adders for summing products formed by multiplying the plurality of frequency domain signals and the plurality of hybrid weight coefficients in pairs so as to generate an output signal for each of a plurality of subcarriers.

2. The hybrid beamforming apparatus as in claim 1, wherein $R_{yy}$ is calculated from the time domain signals and $r_{YD}(k)$ is calculated from the frequency domain signals and the training signal.

3. The hybrid beamforming apparatus as in claim 1, wherein the wireless signal is one of an OFDM signal and a multiple carrier signal.

4. The hybrid beamforming apparatus as in claim 1, wherein the converters comprise means for performing Fast Fourier Transforms or means for performing Discrete Fourier Transforms.

5. The hybrid beamforming apparatus as in claim 1, wherein the weight-coefficient generators operate according to one of follow: criteria: ML (Maximum Likelihood), MSNR (Maximum Signal to Noise Ratio), MSINR (Maximum Signal to Interference Noise Ratio), and MMSE (Minimum Mean Square Error).

6. The hybrid beamforming apparatus as in claim 1, wherein the communication system is one of a WLAN system a WMAN System, and a cellular system.

7. A hybrid beamforming method for a communication system, comprising the steps of:
   (a) receiving a wireless signal as a plurality of time-domain signals using a plurality of antennas;
   (b) processing the time-domain signals into a plurality of frequency-domain signals;
   (c) obtaining a plurality of hybrid weight coefficients from the time-domain signals, the frequency-domain signals and a training signal, wherein the plurality of hybrid weight coefficients correspond to a plurality of subcarriers, and wherein the hybrid weight coefficients are calculated according to the formula $$w_{opt}(k) = \frac{1}{N} R_{yy}^{-1} r_{YD}(k),$$

where $R_{yy}$ is a time-domain correlation matrix and $r_{YD}(k)$ is a cross-correlation vector for a subcarrier k;
   (d) obtaining an output signal for each subcarrier by operation on the hybrid weight coefficients and the frequency-domain signals.

8. The hybrid beamforming method as in claim 7, wherein $R_{yy}$ is calculated from the time domain signals and $r_{YD}(k)$ is calculated from the frequency domain signals and the training signal.

9. The hybrid beamforming method as in claim 7, wherein the wireless signal is one of an OFDM signal and a multiple carrier signal.

10. The hybrid beamforming method as in claim 7, wherein in the step (b), the time-domain signals are processed by one of FFT and DFT.

11. The hybrid beamforming method as in claim 7, wherein step (c) is conducted according to one of follow criteria: ML (Maximum Likelihood), MSNR (Maximum Signal to Noise Ratio), MSINR (Maximum Signal to Interference Noise Ratio), and MMSE (Minimum Mean Square Error).

12. The hybrid beamforming method as in claim 7, wherein the communication system is one of a WLAN system, a WMAN system, and cellular system.

* * * * *